ically effective stabilizers, the dimethyl sulfate is the presently preferred lower dialkyl sulfate for use in this invention. The dialkyl sulfate is prepared by known methods such as by reacting methanol and concentrated sulfuric acid.

3,711,524
PROCESS FOR PREPARING DIALKYLTIN COMPOUNDS
John R. Leebrick, Old Lyme, Conn., assignor of a fractional part interest to Lucille Coon, Cedar Grove, N.J.
No Drawing. Filed July 28, 1971, Ser. No. 167,026
Int. Cl. C07f 7/22
U.S. Cl. 260—429.7                   13 Claims

ABSTRACT OF THE DISCLOSURE

Dialkyltin compounds are prepared by the reaction of lower dialkyl sulfates and metallic tin. The product can be hydrolyzed to give the corresponding dialkyltin oxide.

---

This invention relaates to a novel process for preparing dialkyltin compounds. More particularly, this invention relates to the preparation of lower dialkyltin compounds by a process which comprises reacting a lower dialkyl sulfate, such as dimethyl sulfate, with metallic tin.

Heretofore, dialkyltin compounds have been prepared either by the reaction of alkyl Grignard reagents with tin tetrachloride or by the reaction of alkyl halides, such as methyl bromide, with metallic tin. Neither of these techniques had been found fully satisfactory. The Grignard process is a multiple step process and typically produces a mixture of mono-, di-, tri- and tetrasubstituted products. The alkyl halide reactions must be carried out at high temperatures which, in turn, makes necessary the use of expensive pressure equipment to contain the relatively volatile alkyl halide reactants. Moreover, when the more reactive alkyl bromides and iodides are used, the process is prohibitively expensive unless the halide values can be recovered and reused.

In accordance with certain of its aspects, the process of this invention comprises the preparation of lower alkyl tin compounds by the reaction of a lower dialkyl tin sulfate with metallic tin.

The compounds produced in the process of the invention are lower alkyl tin compounds, and preferably lower dialkyl tin compounds. The preferred lower alkyl groups are methyl and ethyl, with methyl being particularly preferred. The products produced by the process of the invention can be converted, by known techniques, to alkyltin esters, and other derivatives, such as dimethyltin dilaurate, dimethyltin di(oleate), dimethyltin isooctyl mercaptoacetate and dimethyltin di(lauryl mercaptide), which have utility as heat and light stabilizers for various plastics, including polyvinyl chloride and polyolefins.

The lower alkyl tin compounds are produced by the reaction of a lower dialkyl sulfate with metallic tin. The most readily available lower dialkyl sulfates are dimethyl sulfate and diethyl sulfate. As the alkyl chain increases in size, the corresponding dialkyl sulfate becomes much more difficult to prepare. Since dimethyl sulfate is quite easy to prepare, and since dimethyltin compounds are particularly effective stabilizers, the dimethyl sulfate is the presently preferred lower dialkyl sulfate for use in this invention. The dialkyl sulfate is prepared by known methods such as by reacting methanol and concentrated sulfuric acid.

The metallic tin reactant can be in any conveniently available form, including powder, foil, mossy tin, alloys such as speculum metal, ($Cu_3Sn$), magnesium-tin or tin amalgam, pellets, granules, etc. It is desirable to employ a form having a relatively high amount of exposed surface area in order to maximize the rate of tin consumption in the reaction. If desired, the metallic tin can be subjected to some form of surface treatment, such as etching or abrading, prior to the reaction to provide a fresh, reactive surface.

It is desirable to carry out the reaction at elevated temperatures in order to achieve a high rate of conversion of tin to the desired alkyltin compound. Reaction temperatures between room temperature and the decomposition temperature of the reactants and products are feasible, but the preferred range is between about 100° C. and 200° C. The use of elevated temperatures is also beneficial in that any mono- or trialkyltin compounds formed are disproportionated to give the more desired dialkyltin product. At the preferred elevated temperatures, the reaction will be substantially complete in about 1 to 20 hours, and the course of the reaction is readily followed by observing the rate at which the tin metal is consumed.

It is highly desirable that the reaction be carried out in an inert solvent. The use of a solvent aids in temperature control and uniformity of reaction. Any organic solvent which is inert to the reactants and products under the reaction conditions and is a solvent for the dialkyl sulfate can be used. However, the most suitable solvents are those having boiling points at room temperature in excess of about 75° C. and preferably in the range of about 100° C. to 200° C. Such solvents permit convenient control of the reaction temperature by carrying out the reaction at reflux. Examples of suitable solvents include aromatic hydrocarbons such as toluene and xylene, aliphatic hydrocarbons such as mineral spirits, naphtha and kerosene, and aliphatic and alicyclic ethers such as di-n-butyl ether, diethylene glycol dimethyl ether, ethylene glycol di-n-butyl ether, etc. Dimethyl sulfate, when used in excess, can also serve as the solvent. Contact between the reactants can be effected in any convenient manner, such as by mixing the reactants together, by passing the dialkyl sulfate through a bed of tin metal, in the liquid or vapor state, etc.

It is desirable to carry out the reaction under substantially anhydrous conditions. Therefore, the solvents used will preferably be dry and relatively free from contaminants. Freshly prepared and purified dialkyl sulfate is also preferred.

Reaction rates may also be increased by including in the reaction mixture a polar catalyst. Effective catalysts may be selected from those known to function in the reaction of alkyl halides with metallic tin, which include tertiary amines, organophosphines, organoantimony compounds, antimony halides, mercaptans, alkoxides, mercuric salts, iodine and the like. Trialkyl amines and trialkylphosphines such as tri-n-butyl amine are preferred.

It is believed that the process of this invention proceeds in accordance with the following reaction equation:

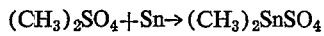
$$(CH_3)_2SO_4 + Sn \rightarrow (CH_3)_2SnSO_4$$

Accordingly, the theoretical ratio of dialkyl sulfate to tin would be 1:1. In practice, however, the dialkyl sulfate is preferably used in substantial excess to increase the reaction rate and to assure maximum utilization of the metallic tin. The excess dialkyl sulfate is readily recovered and recycled.

When a solvent is employed, the reaction product, which is believed to be the corresponding dialkyltin sulfate or a complex form thereof, will typically precipitate from solution as formed, and is easily separated from the reaction mixture by filtration, or, if desired, excess dialkyl sulfate and solvent can be stripped off under vacuum. The product is a white solid which can be dissolved in water or tetrahydrofuran and freed from any unreacted tin or other insolubles by filtration. Alkaline hydrolysis of the product with aqueous base gives the corresponding dialkyltin oxide, which has known utility. Any suitable base can be employed, although strong bases such as the alkali metal hydroxides or alkali metal alkoxides are preferred. The dialkyltin oxide, as recovered, is highly reactive with compounds containing acidic hydrogen to form dialkyltin derivatives. Overall, the yields of product based upon tin metal consumed are quite high, typically of the order of 75% or better.

The following specific examples are illustrative of practice of this invention.

EXAMPLE 1

To a conventional laboratory reactor equipped with stirrer, thermometer, condenser and heat source was charged 252 g. (2.0 moles) of dimethyl sulfate, 118.7 g. (1.0 g. atom) of mossy tin and 9 g. of tributyl amine. The reaction mixture was heated at 160° C. with thorough stirring for 12 hours. At the end of this period, the tin had been consumed. A portion of the excess dimethyl sulfate was removed under reduced pressure and the reaction mixture was cooled to room temperature and filtered to remove the white solid product. The filter cake was washed thoroughly with hexane and the product was air-dried. The yield was in excess of 80% based on tin.

EXAMPLE 2

To the equipment described above was charged 126 g. (1.0 mole) of dimethyl sulfate, 118.7 g. of mossy tin, 13 g. of triphenylphosphine and 100 ml. of xylene. The reaction mixture was refluxed for 12 hours. Nearly all of the tin had been consumed. The bulk of the xylene was removed under reduced pressure and the product was dissolved in excess tetrahydrofuran. Unreacted tin was filtered out and the tetrahydrofuran filtrate was evaporated to yield a solid white product containing a small amount of the organophosphorus catalyst. The yield based on tin was in excess of 75%.

EXAMPLE 3

To equipment similar to that described above was charged 11.9 g. (0.1 g. atom) mossy tin, 25.2 g. (0.2 mole) dimethyl sulfate, 3.7 g. tributylamine and 50 ml. xylene. The mixture was refluxed for 10 hours, then cooled to room temperature. The bulk of the xylene was decanted, and 125 ml. water was added. The remainder of the xylene was azeotroped off and the resulting solution was filtered to remove unreacted tin and color bodies. To the clear filtrate there was slowly added sufficient 25% potassium hydroxide solution to raise the pH to about 8.0. The resulting white precipitate was filtered off, washed with water and dried to give 9.1 g. of dimethyltin oxide of high purity.

EXAMPLE 4

To equipment similar to that described above there was charged 11.87 g. (0.1 g. atom) mossy tin and 50.0 g. (0.4 mole) dimethylsulfate. The mixture was heated at 140–150° C. for 3 hours to give a clear, brown solution.

The bulk of the excess dimethyl sulfate was stripped off under reduced pressure and 100 ml. of water was added. Unreacted tin was filtered off and recovered and the solution was freed of color bodies to give a pale yellow filtrate. Potassium hydroxide was added to pH 8 to hydrolyze the product to dimethyltin oxide, which was recovered by filtration. Approximately 40% of the tin charged was consumed, and the yield of dimethyltin oxide, based on tin consumed, was about 90%.

What is claimed is:

1. The process for preparing lower dialkyltin sulfate which comprises reacting tin with a lower dialkyl sulfate.
2. The process of claim 1 wherein the reaction is carried out in an inert organic solvent for said dialkyl sulfate.
3. The process of claim 2 wherein the reaction is carried out at a temperature of about 100° C. to 200° C.
4. The process for preparing dimethyltin sulfate which comprises reacting dimethyl sulfate with tin.
5. The process of claim 4 wherein the reaction is carried out in an inert organic solvent for said dimethyl sulfate.
6. The process of claim 4 wherein the reaction is carried out at a temperature of about 100° C. to 200° C.
7. The process of claim 6 wherein the reaction is carried out in an inert organic solvent having a boiling point, at atmospheric pressure, between about 100° C. and 200° C. and selected from the group consisting of aromatic hydrocarbons, aliphatic hydrocarbons, aliphatic ethers and alicyclic ethers.
8. The process of claim 6 wherein the reaction is carried out in the presence of a tertiary amine catalyst.
9. The process of claim 6 wherein the reaction is carried out in the presence of a trialkylamine catalyst.
10. The process of claim 6 wherein the reaction is carried out in the presence of a trialkylphosphine catalyst.
11. The process of claim 6 wherein the reaction is carried out in the presence of iodine.
12. The process for preparing lower dialkyltin oxide which comprises reacting a lower dialkyl sulfate with tin, and subjecting the product thereby obtained to alkaline hydrolysis.
13. The process for preparing dimethyltin oxide which comprises reacting dimethyl sulfate with tin, and subjecting the product thereby obtained to alkaline hydrolysis.

References Cited

UNITED STATES PATENTS 3,391,174   7/1968   Wouk _____ 260—429.7

DANIEL E. WYMAN, Primary Examiner
W. F. W. BELLAMY, Assistant Examiner